(12) United States Patent
Girish et al.

(10) Patent No.: US 9,485,542 B2
(45) Date of Patent: Nov. 1, 2016

(54) METHOD AND APPARATUS FOR ADDING AND DISPLAYING AN INLINE REPLY WITHIN A VIDEO MESSAGE

(71) Applicant: General Instrument Corporation, Horsham, PA (US)

(72) Inventors: Praveen Girish, Bangalore (IN); Ramy S. Ayoub, Arlington Heights, IL (US); Santosh Gondi, Lawrence, KS (US); Sadeesh Kumar, Bangalore (IN); Manohar Thagadur Nataraju, Bangalore (IN)

(73) Assignee: ARRIS Enterprises, Inc., Suwanee, GA (US)

( * ) Notice: Subject to any disclaimer, the term of this patent is extended or adjusted under 35 U.S.C. 154(b) by 832 days.

(21) Appl. No.: 13/837,679

(22) Filed: Mar. 15, 2013

(65) Prior Publication Data

US 2014/0280626 A1 Sep. 18, 2014

(51) Int. Cl.
*H04N 21/4788* (2011.01)
*H04N 21/4786* (2011.01)
*H04L 12/58* (2006.01)

(52) U.S. Cl.
CPC .......... *H04N 21/4788* (2013.01); *H04L 51/10* (2013.01); *H04N 21/4786* (2013.01); *H04L 51/16* (2013.01)

(58) Field of Classification Search
CPC ....... H04L 51/08; H04L 51/10; H04L 51/16; H04L 51/22; H04L 65/1096; H04L 65/4007; H04L 51/04; G06F 17/30017; H04N 21/4786; H04N 21/4788; H04N 21/43615
See application file for complete search history.

(56) References Cited

U.S. PATENT DOCUMENTS

| | | | |
|---|---|---|---|
| 7,917,591 B2 | 3/2011 | Vakkalanka | |
| 7,937,443 B2 | 5/2011 | Curry et al. | |
| 8,181,204 B2 * | 5/2012 | Clapper | G06F 17/30017 725/109 |
| 8,243,119 B2 | 8/2012 | Thapa | |
| 8,824,645 B2 * | 9/2014 | Roberts | H04N 21/4788 348/14.01 |
| 8,887,306 B1 * | 11/2014 | Palacio | H04L 65/1083 713/182 |
| 9,065,925 B2 * | 6/2015 | Ferguson | H04M 1/7255 |
| 9,363,472 B2 * | 6/2016 | Rowe | H04N 21/4788 |
| 2002/0078456 A1 * | 6/2002 | Hudson | G06F 17/30017 725/60 |
| 2003/0122922 A1 | 7/2003 | Saffer et al. | |
| 2008/0273077 A1 * | 11/2008 | Cowherd | H04L 65/1096 348/14.06 |
| 2009/0030991 A1 * | 1/2009 | Vakkalanka | H04L 51/08 709/206 |
| 2009/0086012 A1 | 4/2009 | Thapa | |
| 2009/0210778 A1 * | 8/2009 | Kulas | H04N 21/4786 715/201 |
| 2011/0010665 A1 | 1/2011 | Deluca et al. | |
| 2011/0078251 A1 * | 3/2011 | Cross | H04L 51/04 709/206 |
| 2012/0148034 A1 * | 6/2012 | Ferguson | H04M 1/7255 379/88.14 |
| 2012/0317210 A1 * | 12/2012 | Fisher | H04L 51/16 709/206 |
| 2013/0083906 A1 * | 4/2013 | Roberts | H04N 21/4788 379/88.13 |
| 2013/0195421 A1 * | 8/2013 | Chen | G11B 27/034 386/239 |

* cited by examiner

*Primary Examiner* — Ramy M Osman
(74) *Attorney, Agent, or Firm* — Lori Anne D. Swanson

(57) ABSTRACT

Methods of adding an inline reply to a video email/message and presenting a chain of video emails/messages are provided. A video email/message is received and an inline reply to the video email/message is generated and associated with a point during playback of the video email/message. The inline reply is sent by return email such that, during subsequent playback of the video email/message, playback of the video email/message is paused at the point and the inline reply is displayed.

19 Claims, 3 Drawing Sheets

METHOD AND APPARATUS FOR ADDING AND DISPLAYING AN INLINE REPLY WITHIN A VIDEO MESSAGE

BACKGROUND

Electronic mail, or email, is a form of communication typically in text that permits multiple individuals to send, read, and respond to messages at times convenient to each particular individual in a distribution list with gaps of time (minutes, hours, days, months, etc.) permitted between each sent/received message. A written record of the communication thread (i.e., the sequence of communications) typically includes the most recent communication followed by the next most recent communication, and so forth. Thus, such a record is presented in reverse chronological order.

Video email or messaging is a related form of communication that can be sent and received with multimedia client devices such as smartphones, tablets, computers, set-top boxes and the like devices possessing cameras, microphones, and video playing functionality. Video email or messaging may also be referred to as AV or multimedia email or messaging (i.e., contains audio, video and/or other media) and can provide a video clip.

Video emails are similar to traditional text emails in that multiple individuals are able to send, read, and respond to messages at times convenient to each particular individual with significant gaps of time (minutes, hours, days, months, etc.) being permitted therebetween. This is in contrast to video calling, video chat, video-phoning, group video calling, group video chat, and video-conferencing which are visual forms of communication between multiple participants at different locations communicating simultaneously in substantially real-time. The use of video email relieves a user from typing long paragraph messages and permits use of quick to compose and easy to convey AV messages. However, organizing video email communications can be challenging and is not as straight forward as organizing traditional text emails or messaging in reverse chronological order.

By way of example, a sender of a video email may compose a video message using a multimedia client device and may send the video email to one or more recipients. When a particular recipient receives the original AV message and wants to respond to the original video email with a reply video email, the recipient can compose a new video message clip or use an existing video clip which then will be included (as a video link or with an inserted multimedia file) in the reply email. Thus, the reply video message is typically a video clip that is separate from the original video clip message and is sent to the original sender and/or to other recipients present in the original email distribution list in the form of a separate reply. Accordingly, the original video clip and the reply video clip are separate and, when the recipient plays or views the email chain, the two videos are played separately as entirely distinct video clips with no correlation provided therebetween, except that both video clips exist in the same email chain and may or may not concern related topics of interest.

In the above example, an AV email recipient typically has no other option but to view an entire chain of AV emails to fully appreciate the conversation even if only interested in parts thereof. Thus, the user is required to view each AV email individually for purposes of grasping the entirety of the conversation, instead of simply viewing the last email for a record of all conversations as can be accomplished, for instance, with textual email chains. Of course, complexity and time investment of the AV email chain review increases directly with the number of reply video responses and the number of recipients responding within the AV email chain. Further, multiple reply/answer AV messages which are sent in response to different parts of a single AV message cannot be organized in any particular manner. For instance, if many recipients actively reply/respond to many sub-parts of different AV messages, it is difficult to readily determine an exact point to which each reply/response is directed due to the conventional serial nature of organizing video emails.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Embodiments of methods, systems and apparatus are provided herein with respect to a technique of presenting synchronized video messages including video clips from different participants in a so-called inline replying/answering form. Thus, the embodiments enable an inline reply feature for an AV or other multimedia email and provide a sophisticated organizational scheme for representing AV email chains on a multimedia client device. Thus, a video email user is provided a mechanism for including inline responses to an original video email or to another reply video email within a video email chain.

By way of example, the technique may permit a video email recipient to view an original video email or another video email within an email chain with commands such as "play", "pause", and "seek" to locate a desired point within the video email to which an inline response is desired to be inserted. At this desired point, the recipient can become a composer and create an inline response to add a reply/response video clip or other multimedia or textual message to the original or other video email. Each reply video email can contain either multiple video clips representing one video clip per comment or a single video clip containing all comments pertaining to a single reply.

For purposes of distinguishing and properly handling numerous different video clips (i.e., original, reply, counter-reply, etc.) composed or sent from different email participants in an email chain, a video email playing device or other client device may utilize a metadata file or table or like mechanism that associates each video email within a chain to its composer and the point within which other video clip a particular video clip should be inserted as an inline response. The meta-data file can be, for instance, in an extensible markup language (XML) format with sequence based or time based tags.

Figure 1:
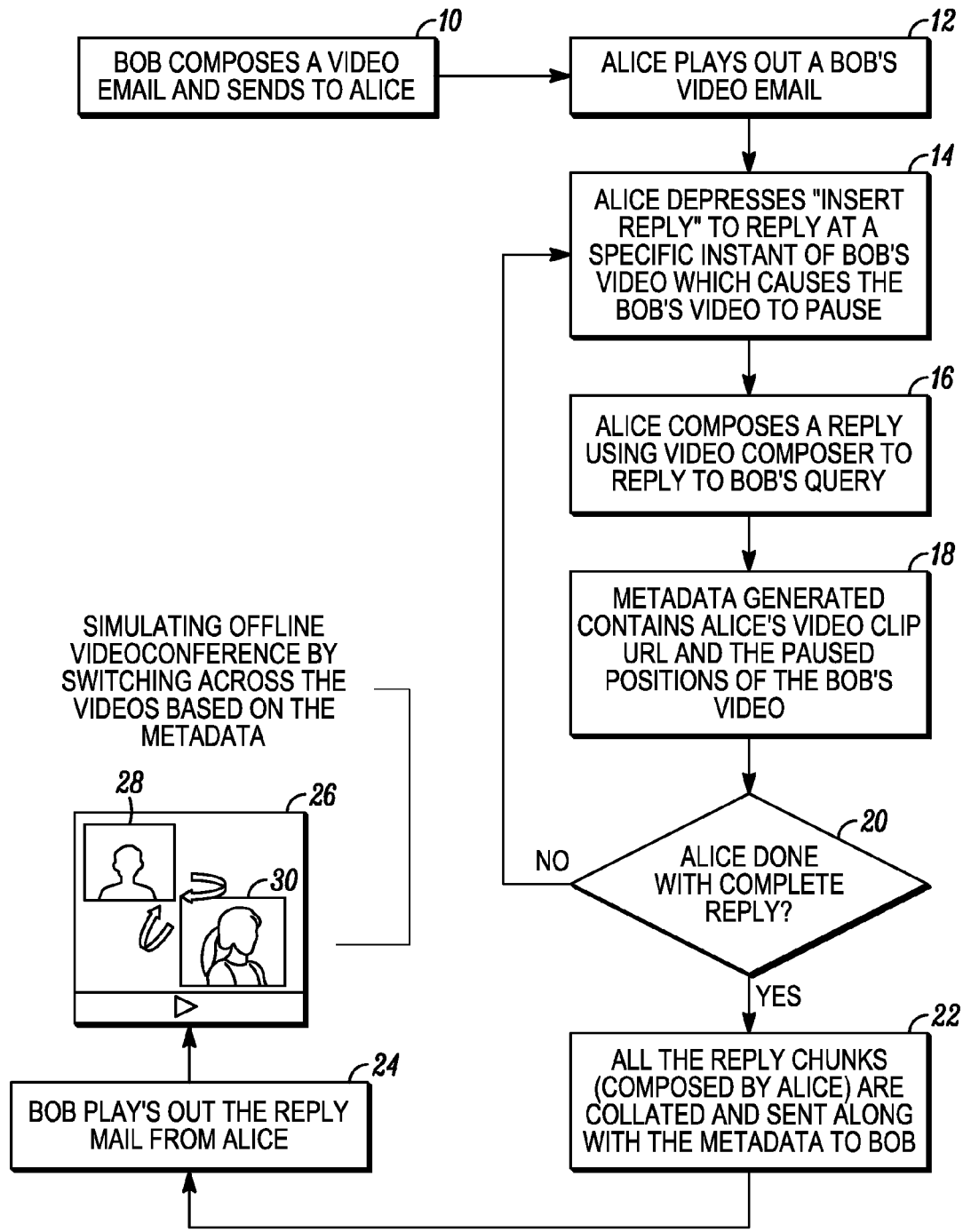
FIG. 1 is a flowchart providing an example of a so-called "offline" video conference between two participants in accordance with an embodiment.

A contemplated embodiment may include the following functions and require the following steps. These functions and steps are disclosed by way of example, not by way of limitation. An original AV email composer may compose a new AV email and send it to one or more recipients within a distribution list of recipients. In FIG. 1, this step is reflected in box 10 in which "Bob" (an original AV email composer) composes a video email with a multimedia client device and sends the original AV email to "Alice" (a recipient).

In turn, a recipient of an AV email may view the original video clip by issuing a Play/Start command on a multimedia client device or play may be set to begin automatically and appear within a defined window on a display screen or full screen depending upon desired display settings. In FIG. 1, this step is reflected in box 12 in which "Alice" plays "Bob's" video email with a multimedia client device. Examples of client devices include any multimedia device such as smartphones, tablets, personal computers, lap-top computers, set-top boxes, and like IP-enabled devices associated with video players and recorders, display screens, cameras, and microphones and able to receive and process AV or other multimedia emails. When the recipient actuates a Play/Start command or the original video clip otherwise begins to play, the video data stream may be streamed from a server using any protocol, such as RTP/RCP, RTSP, and HTTP. The email may include metadata as discussed below, a hyperlink to the original video clip, or a video data file containing the original video clip.

If at any time after receiving the video email it is desired by the recipient to provide a comment/response to subject matter presented at a particular point, video frame, or section of video within the original video message, the recipient while viewing the original video message or clip can actuate an inline response feature, for instance, by depressing an "Insert Reply" button or take some other form of action to pause the playback of the original video clip at the point of interest in the original video message and to include the recipient's reply/response exactly at this point of interest. Thus, the recipient's reply/response is provided inline within the original video clip.

As an example, after the inline response feature is actuated, the recipient/viewer of the original video message takes on the role as a composer and is provided an opportunity to record a new video or multimedia message as an inline response or to insert a pre-existing video or multimedia message as an inline response. The inline response can be composed, for instance, using a webcam or other video camera and microphone connected to or provided by the client device or terminal. As a further option, the inline response could be provided simply in the form of plain text or a drawing, picture, or other still image (i.e., the inline response is not required to be a video).

In FIG. 1, the above described steps are shown in box 14 in which, during the playback of "Bob's" video email, "Alice" actuates an "insert reply" button on her multimedia client device to add an inline reply to a specific point or frame in "Bob's" video. This causes playback of "Bob's" video to become paused. As shown in box 16, "Alice" then proceeds to compose a reply in the form of a video to reply to and/or answer a particular topic discussed by or queried by "Bob" in his video email. As a result, metadata is generated by "Alice's" multimedia client device and contains information concerning the storage location of "Alice's" video reply and to the position or frame within "Bob's" video that "Alice's" video reply should be displayed during subsequent playbacks of "Bob's" video by "Bob" or other recipients. See the step shown in box 18. The steps 14, 16 and 18 may be repeated by "Alice" (see box 20) as many times as desired so that additional replies can be composed by "Alice" with respect to other points within "Bob's" video.

Thus, along with the inline reply message, metadata can be generated providing placement information of the reply message within the original video message and can be stored in the form of a table or the like. The metadata may include time, offset, video frame, marker or tag, or like positional information of the point within the original video message that the inline reply message should be played or displayed during all subsequent playback of the original video message. The metadata may also include a Uniform Resource Locator (URL) of the original video message and a URL of the reply message.

The composed inline reply and the above referenced metadata can be attached or sent to the creator of the original video email or to any other recipients within a distribution list. In FIG. 1, this is shown in box 22 in which all of "Alice's" reply video chunks are collated and sent with the generated metadata to "Bob" via a reply email. Thereafter, when any of the reply email recipients view the email chain which includes at least one video email, the recipients will be able to view the original video message which is played until the point of interest where the reply message has been inserted. At this point along the playing of the original video message, the original video message is paused and the reply message appears. If the reply message is a video, the reply video message begins to play. Upon completion of the reply video message or after a pre-set delay when a still image or text is displayed, the original video message resumes playing at the point where it was paused for the inline message.

In FIG. 1, the above step is shown in box 24. Here, "Bob" receives "Alice's" reply email with his multimedia client device. When "Bob" plays the video, he first sees his own original video which plays until the first point or video frame to which "Alice" provided an inline reply. At this point, "Bob's" original video is paused and "Alice's" reply video begins playing. Thus, as shown in the display screen 26 in FIG. 1, "Bob's" original video is shown paused in a smaller upper window 28 on the screen 26 of "Bob's" multimedia client device and "Alice's" reply video plays in the larger lower window 30. This essentially simulates so-called "offline" video conferencing in that different videos are played and paused at different times in an organized manner as controlled according to the metadata provided with the inline reply messages.

As discussed above, the above referenced steps of composing an inline response, generating metadata, and sending a reply email to recipients can be repeated as often as desired by as many recipients of the email chain as desired. Inline responses can be added to the original video message at any point therein and can also be added and inserted within any reply video message previously inserted throughout the full playback length of the original video message. Thus, a recipient can provide an inline reply video or other message to the original video message as well as to any other reply video message or counter reply video message or comment on any message in the email chain. The various inline messages will recursively play through all the chain of reply messages and playback of the messages within the email chain will ultimately end with the ending of the original video message in a manner simulating a live video conference.

Thus, the numerous video email messages in the email chain (i.e., the original, replies, counter replies and the like) are viewed in an organized manner as a set of messages from numerous different individual recipients involved in the email chain conversation. If these messages are video messages, the set of video emails can be thought of and will automatically be organized as a form of "offline" video conferencing in that, when played, the separate video clips composed by different composers and at different times are displayed in a manner in which the clips are spliced together thereby resembling a live video conference during playback. Accordingly, unlike textual email chains, simple reverse chronological order is not utilized.

For example, the beginning of the set of video email messages starts with playback of the beginning of the original video message. Thus, whenever any recipient in the video email chain views the set of video messages from the beginning, playback begins from the start of the original video email message which continues to play until a first entry in a metadata table or other marker or tag is reached that causes video playback of the original video message to be paused. At this time, playback is switched to one of the inline reply massages identified for playback at this particular point of the original video message. On completion of the playback of reply video message, playback is switched to the original video message at the point where it was paused, and playback thereof is resumed at this point.

Accordingly, the above method ensures the set of video email messages are shown in a proper and desired order in the way the reply messages were marked when they were composed. For instance, if the original video message references a particular sub-topic, a recipient's response to this particular sub-topic and any counter response thereto can be played directly at the point it is referenced in the original video message or within another reply message. The viewer of the set of video email messages may be provided with an option of fast forwarding any of the video clips to his/her area or point of particular interest discussed within the email chain.

Various alternatives or mechanisms for switching between and/or across the multiple video streams of the original, inline replies, and inline counter replies can be utilized. As one example of an alternative to the use of a metadata look-up table, the composer of an inline reply may switch between the original email video stream and the local camera stream by actuating or toggling an "Insert reply" button or the like. In this case, the composer creates an entirely new interstitial video composed of existing video components and new local webcam video components. In this manner, the need for creating, sending and reading metadata for purposes of identifying video stream playback switches can be eliminated. This scheme may be particularly beneficial when email storage does not present an issue and if easier implementation is desired that does not require any special video player or software application.

As a further alternative, a Picture-in-picture (PIP) feature can be utilized such that the original video message is not actually switched entirely off of the display screen when a reply or counter reply video message or other message is displayed. For instance, see screen 30 and windows 28 and 30 in FIG. 1. The original video message is shown in a paused condition in a designated field of the screen (i.e., a PIP window), and the response video message or other message form is shown in the remaining or other designated part of the display screen. Here, on completion of the playing of the response video message, the original video message may return from the PIP window to a full screen or other type of display format. In this manner, the active reply video may occupy a center or other designated portion of the display screen and the video message from which the playback is switched would be inactive providing an effect that the video at the main window is the response for the video clip displayed in the PIP window. Still further, in the case of a multi-party conversation, for instance where 3 or more people would have replied to the original video message at the same point in the message, video windows for each of the parties would be visible with only the active video reply being highlighted and shown within a larger or more predominant window.

A specific example of metadata generated for a video email conversation including four participants interacting with each other and replying to specific inline points in an original video or multimedia email is discussed below. The four participants involved in a video email chain are referenced as P1, P2, P3 and P4. Each AV email sent by a participant is represented by: "Participant ID.MessageId" (where the "Participant ID" field identities the particular participant (i.e., P1, P2, P3 or P4) and the "MessageId" field starts with the number 1 and sequentially increases therefrom on the addition of each new video message added by the participant to the email chain). In this example, the AV Message Playback duration may be represented by an underline character ('_') with each '_' representing one second of playback duration.

The format of the metadata generated for each video message may be as follows: "Url Pa.b><Offset><URL_Pc.d>", where: <URL_Pa.b> provides the URL, of the original video received from Participant "Pa" and the 'b' indicates the number of the reply from Participant "Pa"; <Offset> provides an offset position (time, frame, marker, tag, etc) at which the video playback switching occurs; and <URL_Pc.d> provides the URL of the reply video to which playback is to be switched. Here, the reply video originated from Participant "Pc" and "d" indicates the number of the reply from "Pc".

As a specific example, if participant P1 initiates a new conversation with the first AV message having a duration of about 1 minute, the first AV message when viewed by any of the other recipient participants will be: (P1.1, 0 sec to 1 min)*_____*. Here, the underline characters represent continuous play of the AV message from start to finish. Metadata generated for this first message can be provided in the following format: <Url_P1.1>, where <offset> and <Url_Pc.d> are invalid or have no values which indicates that this is the originating message and that it will be played completely as is with no switching when initially viewed by recipients.

After viewing P1's AV message, P2 may add a video or other multimedia comment at, for instance, the $20^{th}$ second of playback of P1's original video message. P2's reply may have duration of 20 seconds. In addition, P2 may also add a video or other multimedia comment at the $30^{th}$ second of P1's AV message with reply duration of 10 seconds. The following two sets of metadata may be created for P2's replies and may be visualized as follows: "<Url_P1.1><20><Url_P2.1>
<Url_P1.1><30><Url_P2.2>". Here, P2.1 identifies P2's first reply (reply at the $20^{th}$ second of P1's AV message) and P2.2 identifies P2's second reply (reply at the $30^{th}$ second of P1's AV message).

When P2's video email is sent and received, playback of P1's original message may begin and will become paused at the 20 second point. At this time, P2's first message which can be found at URL_P2.1 is played. After the video at URL_P2.1 completes playback, control switches back to the video at URL_P1.1 and play of the original message resumes at the switched offset position and continues playing until the next offset position is found (i.e., URL_P2.2) or the original video ends.

Accordingly, when the participant P2 sends out, the above described reply email to other recipients in the chain, the generated metadata can be represented as follows: "<Url_P1.1><20><Url_P2.1> <Url_P1.1><30><Url_P2.2>". Thereafter, the video email sent to any participant would be played out in the following order: (P1.1, 0 to 20 seconds)*_____*; (P2.1, 0 to 20 seconds)*_____*; (P1.1, $21^{st}$ to 30 seconds) *_____*; (P2.2, 0 to 10 seconds)*_____*; (P1.1, $31^{st}$ second to $1^{st}$ minute)*_____*. Here, the discontinuous nature of the underline characters demonstrates that the different reply videos start and stop at different points and playback of the original message pauses and resumes at different points.

Extending this concept further, a third participant (P3) may introduce video responses to the original message as well as the replies from the second participant (P2). This may be represented as follows: "Url_P1.1><10><Url P3.1><Url P1.1><10><Url_P2.1><10><P3.2> <Url_P1.1><30><Url_P2.2>". Thereafter, the second video email reply sent to any participant would be played out in the following order: (P1.1, 0 to 10 secs)*_____*; (P3.1, entire first comment video clip)*_____*; (P1.1, $11^{th}$ to 20 secs)*_____*; (P2.1, 0-10 seconds of the first comment from P2)*_____*; (P3.2, entire second comment from P3)*_____*; (P2.1, 11 second to completion of first comment from P2.1)*_____*; (P1.1, 20-50 seconds)*_____*; (P2.2, entire second comment from P)*_____*; (P1.1, remainder of message) *_____*. This example demonstrates the ability to embed video replies not only in the original message, but also within video responses from other participants.

Multiple replies from a participant in the above example can be sent as separate video clips. However, as an alternative to this approach, the original video message and all replies can be concatenated as one reply from the participant and could be sent along with the metadata. As the mail chain grows and replies, counter replies, and comments are added, the resulting set of video messages essentially simulate so-called "offline" video conferencing with respect to a viewer playing and switching across the set of video messages in the above described order and sequence. The metadata that may be sent along with the AV messages can be used to define points of switching across AV emails which makes sure that all the AV messages are played back in an organized sequence such that inline replies are played at corresponding sub-parts of the original video message.

Figure 2:
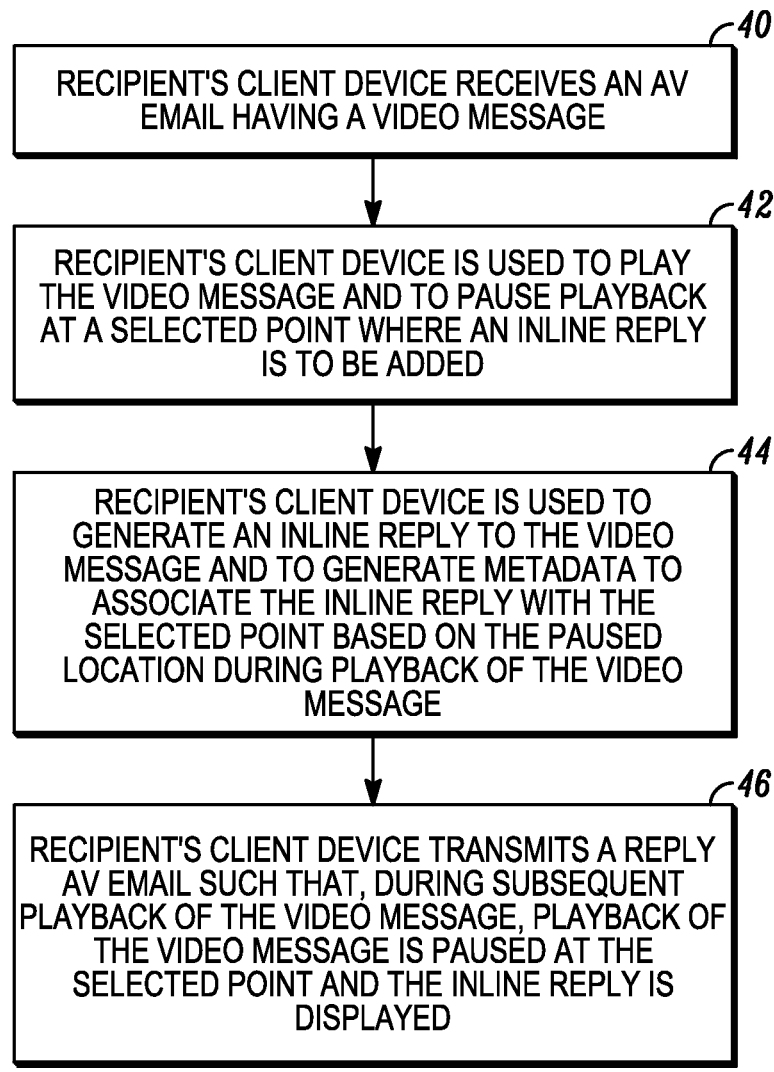
FIG. 2 is a flowchart of process steps in accordance with an embodiment.

The flowchart shown in FIG. 2 provides an example of process steps for adding an inline reply to a video message. In the first step, an electronic communication (i.e., email) in the form of an AV email is received with a multimedia client device. See step 40. An inline reply is generated to the video message and associated with a point during playback of the video message. See step 44. The reply electronic communication in the form of an AV email is then transmitted such that, during subsequent playback of the video message, playback of the video message is paused at the point and the inline reply is displayed. See step 46.

The metadata provided in step 44 includes information with respect to the point at which the inline reply should be displayed during playback of the video message, and the step 46 of transmitting the reply includes sending the metadata with the reply. The information provided by the metadata with respect to the point during the playback of the video message can be offset information, time information, video frame information, or marker or tag information. The step 44 of generating the inline reply and the metadata with the multimedia client device can occur after a step 42 of playing and pausing the video message at an inline reply point so that information of this point is automatically captured by the multimedia client device and represented in the metadata. When the inline reply is a reply video, the metadata can include an identification of a composer of the inline reply, a uniform resource locator (URL) of the reply video comprising the inline reply, and a URL of the video message.

Figure 3:
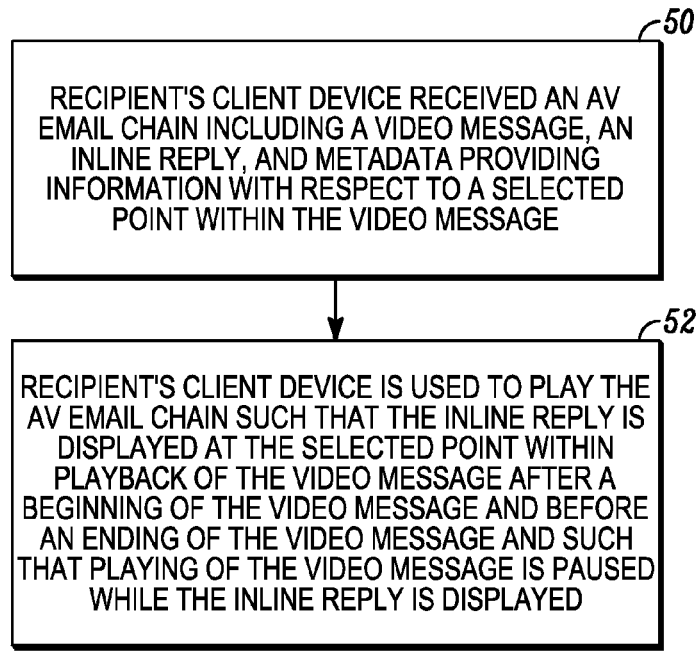
FIG. 3 is a flowchart of process steps in accordance with an embodiment.

The flowchart shown in FIG. 3 provides an example of process steps for presenting a video message on a multimedia client device. An electronic communication is received with a multimedia client device and is in the form of an email chain including an original video message composed by a first participant and a reply message composed by a second participant. See step 50. The step 50 of receiving the electronic communication may include receiving metadata providing information with respect to the point at which the reply message should be displayed during playback of the original video message.

The original video message and the reply message are displayed on a display screen of or connected to the multimedia client device such that the reply message is displayed at the point specified by the metadata within playback of the original video message after a beginning of the original video message and before an ending of the original video message and such that playing of the original video message is paused while the reply message is displayed. See step 52. When the reply message is displayed, the original video message may be removed from the display screen or it may appear in a paused condition in a part of a display on which the reply message is displayed. Playback of the original video message resumes after completion of the reply message. The above is applicable even in multi-party conversations including video email chains including video messages and replies from three or more participants.

Figure 4:
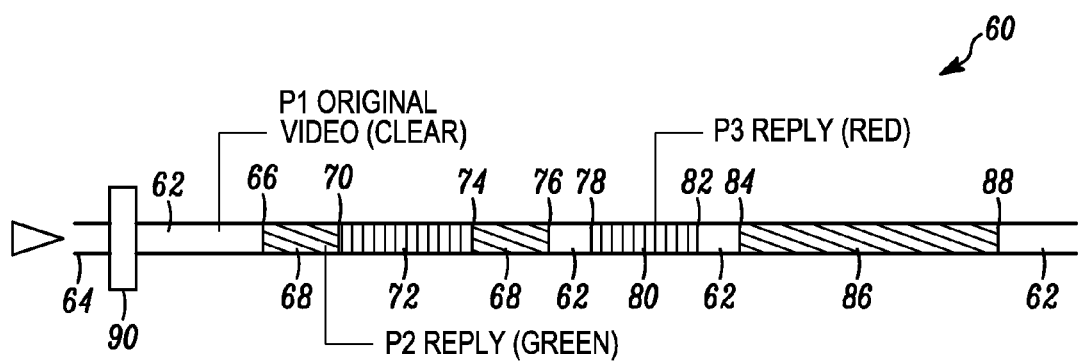
FIG. 4 is a view of a display of a video progress bar in accordance with an embodiment.

By way of example including video messages from three different participants, P1, P2, and P3, a video progress bar 60 is shown in FIG. 4. The video progress bar 60 reflects the time duration and location of each reply within the original video message. Thus, playback of an original video message 62 of P1 starts at point or frame 64 of the original video message 62 and continues for a period of time until point or frame 66 is reached. At point or frame 66, playback of the original video message 62 is paused, and playback of a first reply message 68 of P2 begins for a period of time until point or frame 70 of the first reply message 68. Here, a first reply message 72 of P3 is embedded within the first reply message 68 of P2. Thus, at point or frame 70, playback of the first reply message 68 of P2 is paused and playback of the first reply message of P3 is started and proceeds to completion at point or frame 74. At point or frame 74, playback of the first reply message 68 of P2 is resumed where it was previously paused and continues to play until its completion at point or frame 76.

At point or frame 76, playback of the original message 62 of P1 is resumed where it was previously paused and continues to play until point or frame 78. Here, a second reply message 80 of P3 is embedded within the original message 62 of P1. Thus, a point or frame 78, playback of the original message 62 of P1 is paused and playback of the second reply message of P3 is started and proceeds to completion at point or frame 82. At point or frame 82, playback of the original message 62 of P1 is resumed where it was previously paused and continues to play until point or frame 84. Here, a second reply message 86 of P2 is embedded within the original message 62 of P1. Thus, a point or frame 84, playback of the original message 62 of P1 is paused and playback of the second reply message 86 of P2 is started and proceeds to completion at point or frame 88. At point or frame 88, playback of the original message 62 of P1 is resumed where it was previously paused and continues to play until completion. Of course, the above only provides an example and embedded video clips from more than three participants could be included.

The above referenced video progress bar 60 may also be displayed to the user throughout playback of the video messages. In this way, a viewer is provided with information as to which point in a chain of video messages that the viewer is currently viewing. This also enables a user to fast forward or move to a point in the discussion of particular interest to the viewer. A cursor or the like 90 movable along the video progress bar 60 may provide information as to the point in the conversation that is currently being displayed and provide a mechanism for fast forwarding or re-winding playback to a particular point on the video progress bar 60 such as by dragging or re-positioning the cursor 90 to the desired point.

The multimedia client devices discussed above may include at least one electronic processing unit that can run or be loaded with a software application to provide the above process steps. In addition, a non-transitory computer readable storage medium having computer program instructions stored thereon that, when executed by a processor, cause the processor to perform the above discussed operations can also be provided.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

In addition, the above referenced client devices, electronic processing units, components, modules, equipment, boxes, and the like for carrying out the above methods can physically be provided on a circuit board or within another electronic device and can include various processors, microprocessors, controllers, chips, disk drives, and the like. It will be apparent to one of ordinary skill in the art that the processors, controllers, tuners, modules, managers, and other components may be implemented as electronic components, software, hardware or a combination of hardware and software.

One of ordinary skill in the art appreciates that various modifications and changes can be made without departing from the scope of these embodiments as defined in the appended claims.

We claim:

1. A method of adding an inline reply to a video message, comprising the steps of:
   receiving the video message in an electronic communication via a multimedia client device, the electronic communication including with the received video message an associated metadata identifying an original video message and playback points of one or more previously associated inline replies;
   generating the inline reply to the received video message and associating the inline reply with a new playback point within the received video message;
   generating an updated metadata in a context of the received metadata for identifying a) the new playback point in the received video message for which the generated inline reply is associated and b) a storage location of the generated inline reply,
   wherein the updated metadata is generated to chronologically relate the generated inline reply to a playback point of at least one of the original video message or one or more previously associated inline replies; and
   transmitting a reply electronic communication including the updated metadata such that, during subsequent playback of the video message, an order of playback between the original video message and one or more inline replies is identifiable via the playback points in the updated metadata, and the storage location of the original video message and the one or more inline replies is identifiable via the updated metadata for switching between based on the order of playback between the original video message and the one or more inline replies.

2. A method according to claim 1, wherein information provided by the metadata with respect to a point during the playback of the video message is selected from a group consisting of offset information, time information, video frame information, and marker information.

3. A method according to claim 1, wherein the inline reply is a reply video, and wherein the metadata includes an identification of a composer of the inline reply, a uniform resource locator (URL) of the reply video comprising the inline reply, and a URL of the video message.

4. The method according to claim 1, further comprising the steps of:
   playing the video message with the multimedia client device; and
   pausing playback of the video message at a point when the inline reply is to be displayed;
   wherein said step of generating the inline reply and the metadata with the multimedia client device occurs after said pausing step so that information of the point is automatically captured by the multimedia client device and represented in the metadata.

5. The method according to claim 4, wherein said step of playing the video message includes displaying a video progress bar providing a timeline representation of where the inline reply is to be played within a duration of the video message.

6. The method according to claim 1, wherein the inline reply is in a form of a reply video, and wherein said generating step includes recording the reply video.

7. The method according to claim 1, wherein the video message includes an inline video reply as received as part of a chain of electronic communications, and wherein said step of generating metadata concerning the inline reply is with respect to an additional inline reply to the video message.

8. The method according to claim 1, wherein one or more previously associated inline replies in the video message includes an inline video reply as received as part of a chain of electronic communications, and wherein said step of generating updated metadata concerning the inline video reply is with respect to a counter inline reply to the inline video reply as received as part of the chain of electronic communications, and wherein the playback point of the counter inline reply is a point within the inline video reply as received as part of the chain of electronic communications.

9. The method according to claim 1, wherein said step of generating the inline reply to the video message and associating the inline reply with a point during playback of the video message includes creating a new interstitial video composed of existing video components of the video message and a new video component of the inline reply.

10. The method according to claim 1, wherein the multimedia client device is selected from a group consisting of a smartphone, tablet, personal computer, lap-top computer, set-top box, and IP-enable device having an associated display screen, camera and microphone.

11. A method of presenting a video message, comprising the steps of:
receiving an electronic communication with a multimedia client device, the electronic communication being in a form of an email chain including an original video message composed by a first participant and one or more reply messages composed by one or more additional participants, the electronic communication including an associated metadata identifying the original video message and playback points of the one or more reply messages;
displaying the original video message and the one or more reply messages in accordance with the metadata such that each reply message is displayed at a point within playback of the original video message after a beginning of the original video message and before an ending of the original video message, and further are displayed in a chronological order with respect to any other reply messages based on the playback points identified in the metadata, such that playing of the original video message is paused while each of the one or more reply messages is displayed.

12. The method according to claim 11, wherein, when the reply message is displayed, the original video message ceases from being displayed and only resumes being displayed after completion of the reply message in a manner simulating a live video conference.

13. The method according to claim 11, wherein, when the reply message is displayed, the original video message is displayed in a paused condition in a part of a display on which the reply message is displayed in a manner simulating a live video conference.

14. The method according to claim 11, wherein said step of receiving the electronic communication includes receiving metadata providing information with respect to the point at which the reply message should be displayed during playback of the original video message, and wherein the information provided by the metadata with respect to the point during the playback of the original video message is selected from a group consisting of offset information, time information, video frame information, and marker information.

15. A method according to claim 14, wherein the reply message is a reply video, wherein the metadata includes an identification of a composer of the reply message, a uniform resource locator (URL) of the reply video comprising the reply message, and a URL of the original video message, and wherein the multimedia client device is selected from a group consisting of a smartphone, tablet, personal computer, lap-top computer, set-top box, and IP-enable device having an associated display screen, camera and microphone.

16. The method according to claim 11, wherein said step of displaying the original video message includes displaying a video progress bar providing a timeline representation of where the reply message is to be played within a duration of the original video message.

17. A multimedia client device, comprising:
at least one electronic processing unit for:
receiving a video message in electronic communications and an associated metadata identifying an original video message and playback points of one or more previously associated inline replies, and
playing and displaying the video message on an associated display screen;
said at least one electronic processing unit being configured to:
generate an inline reply to the received video message,
associate the inline reply with a playback point within the received video message during playback of the video message,
generate an updated metadata in a context of the received metadata for identifying a) the playback point in the received video message for which the generated inline reply is associated and b) a storage location of the generated inline reply,
wherein the updated metadata is generated to chronologically relate the generated inline reply to a playback point of at least one of the original video message or one or more previously associated inline replies; and transmit the inline reply including the updated metadata to recipients via an electronic communication such that, during subsequent playback of the video message, an order of playback between the original video message and one or more inline replies is identifiable via the playback points in the updated metadata, and the storage location of the original video message and the one or more inline replies is identifiable via the updated metadata for switching between based on the order of playback between the original video message and the one or more inline replies.

18. A multimedia client device according to claim 17 wherein said at least one electronic processing unit is configured to receive a chain of electronic communications including the video message and a reply message associated with a point during playback of the video message and to pause playback of the video message at said point during playback, display the reply message, and then resume playback of the video message such that the reply message is displayed inline with the playback of the video message.

19. A multimedia client device according to claim 18, wherein the reply message is a reply video, and wherein the at least one electronic processing unit uses metadata provided with the chain of electronic communications to identify the point during playback of the video message when the reply message is to be displayed.

* * * * *